United States Patent

[15] 3,636,685

Speckman

[45] Jan. 25, 1972

[54] ROTARY LAWNMOWER BLADE

[72] Inventor: Clifford H. Speckman, Aurora, Ind.

[73] Assignee: Tony Locono, Modesto, Calif. a part interest

[22] Filed: Mar. 15, 1971

[21] Appl. No.: 124,031

[52] U.S. Cl. ...........................................................56/295
[51] Int. Cl. .....................................................A01d 55/18
[58] Field of Search ...................................56/17.5, 255, 295

[56] References Cited

UNITED STATES PATENTS

| | | | |
|---|---|---|---|
| 2,799,985 | 7/1957 | Rosenberg | 56/295 |
| 3,068,633 | 12/1962 | Taylor | 56/295 |
| 3,097,469 | 7/1963 | Belfiore | 56/295 |
| 3,445,992 | 5/1969 | Hanson et al. | 56/295 |
| 3,534,534 | 10/1970 | Raiti | 56/295 |

*Primary Examiner*—Russell R. Kinsey
*Attorney*—Wood, Herron & Evans

[57] ABSTRACT

A rotary lawnmower blade having cutting edges along the leading edges thereof adjacent the respective ends in which the trailing edges opposite the cutting edges each have an opening therethrough and a vane paralleling the opening that is canted to create an updraft through the opening and thereby pull grass up into the cutting circle of the blade.

10 Claims, 8 Drawing Figures

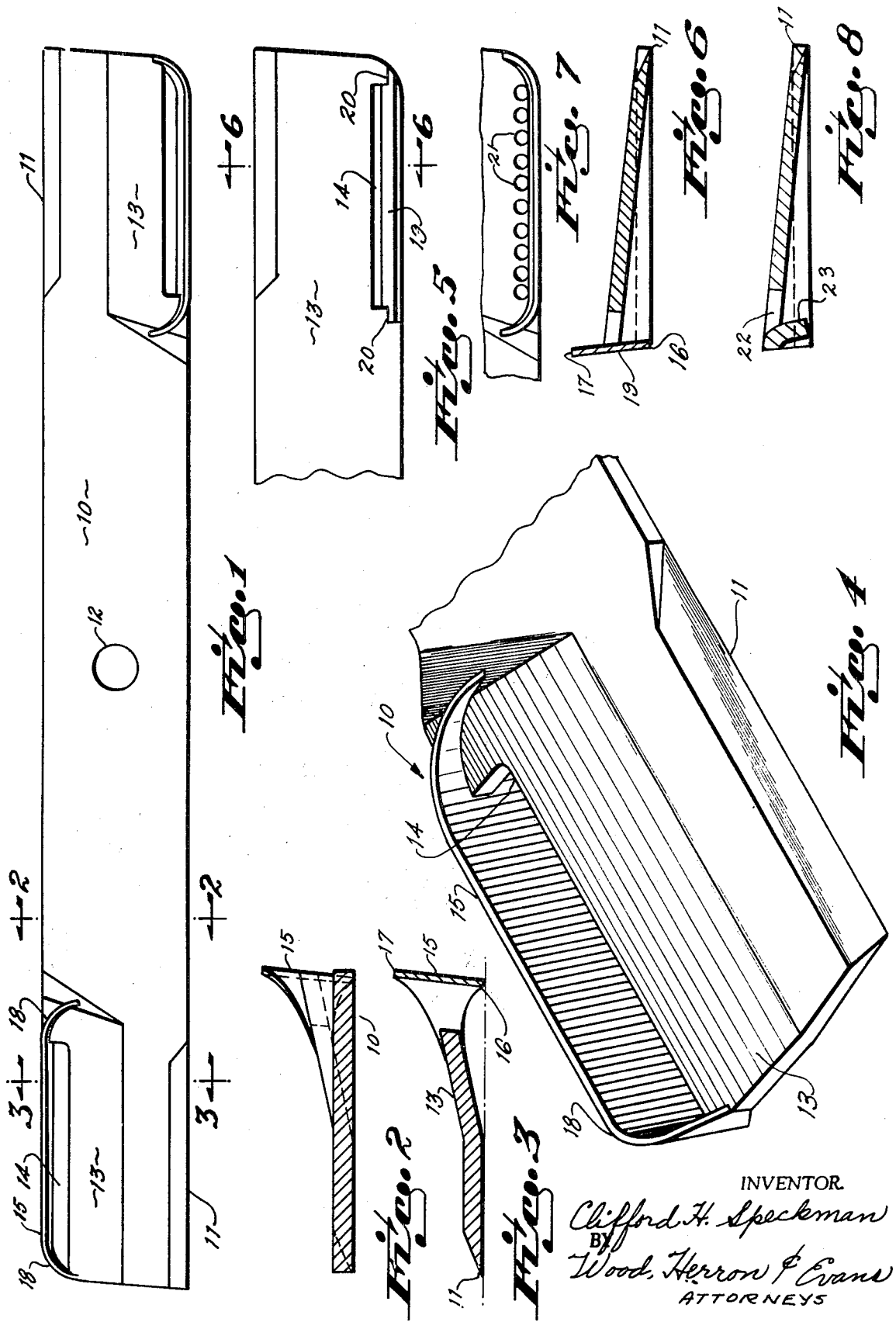

ROTARY LAWNMOWER BLADE

This invention relates to rotary lawnmower blades and it is directed in particular to an improved construction for the trailing edges adjacent the ends thereof that creates a substantial updraft to pull grass up into the cutting circle of the blade.

Most rotary lawnmower blades in the past have had their ends bent up or otherwise configured to create a fan effect to provide some semblance of an updraft. The improved blade construction of this invention goes far beyond the prior art in this respect. For one, the trailing edge of each end of the blade has an opening in it, for example, a longitudinal slot, so that air may pass up through the blade. Second, a vane is mounted on the blade such that it forms the trailing edge of the opening. The vane is canted so that its lower edge leads its upper edge. The vane thus acts as an airscoop insuring that a forceful stream of air is directed upward, being pulled from beneath the blade, through the opening and ejected out the top thereof, thereby pulling grass beneath the blade up into the cutting circle.

It may be seen therefore that the opening-vane construction develops a positive upward airflow starting from beneath the cutting circle and moving up through the circle. This is in contrast to the fan action blades of the past which directed air upwardly to some extent, but primarily only from the upper surfaces of the blade ends. Otherwise expressed, past blades did not form a positive updraft starting below and going up through the cutting circle, but instead created an updraft for the most part above the cutting circle only.

Reference is made to the drawings in which:

FIG. 1 is a top plan view of a rotary lawnmower blade incorporating the principles of this invention;

FIG. 2 is a cross-sectional view taken on the line 2—2 of FIG. 1;

FIG. 3 is a cross-sectional view taken on the line 3—3 of FIG. 1;

FIG. 4 is an enlarged, fragmentary perspective view showing the construction of an end portion only of the blade of FIG. 1;

FIG. 5 is a top plan view showing a portion only of an end of a modified form of a blade incorporating the principles of this invention;

FIG. 6 is a cross-sectional view taken on the line 6—6 of FIG. 5;

FIG. 7 is a plan view of an end part of a blade illustrating another modified form of the invention;

FIG. 8 is a cross-sectional view illustrating still another modified form of the invention.

A blade made in accordance with this invention is shown generally at 10. Following conventional practices, this blade has a cutting edge 11 in each outer endwise portion thereof that leads in the direction of rotation of the blade. 12 indicates a center hole by which the blade may be fastened to a drive shaft. Each end of the blade is bent upwardly as at 13 to provide a slanting portion taking in approximately one-half of the width of the trailing portion of the blade to the rear of the cutting edge 11.

Preferably the trailing edge at each end of the blade is slotted as shown at 14. In the instance shown in FIG. 1 this is accomplished by cutting out a section of the trailing edge of the blade opposite cutting edge 11 and providing a vane 15 that forms the rear side of slot 14. As shown in FIG. 3 the lower edge 16 of vane 15 leads upper edge 17 in the direction of rotation of the blade. The cant or slant thus given the vane may be from 5° to 15° or more from the vertical so that air beneath the blade is scooped into and up through slot 14 during rotation of the blade. This construction insures a positive removal of air from below the cutting circle of the blade so that grass beneath the cutting circle is lifted up into the cutting circle.

In the instance shown in FIG. 1 the opposite ends of the vane 15 are bent on an arc as shown at 18—18, these ends being slotted to engage over the upper and lower surfaces of the blade with the ends being then welded or brazed to the blade. As may best be seen in FIG. 3 each vane 15 is attached to the upwardly slanting portion 13 in the trailing half of the end of the blade. It is preferred that the lower leading edge of the blade 16 extend down no farther than the plane of the adjacent cutting edge 11 of the blade. This is to insure that the vane does not strike obstructions or objects that may be encountered during the mowing of the lawn. The upper, trailing edge 17 of the vane may terminate at a point substantially above the blade, this being determined by the configuration of the housing in which the blade is mounted.

The modification of the invention shown in FIGS. 5 and 6 shows a planar vane 19 having its ends set into seats 20—20 and secured thereto by brazing or welding. Again, as shown in FIG. 6, it is preferred that lower leading edge 16 of vane 19 extend no farther down than the level of the adjacent cutting edge 11 of the blade.

During rotation of the blade there is a radial component given the updraft that issues from the slot 14. The outer curved end 18 of vane 15 inhibits this outward component to a great extent and is the preferred construction for this reason. However, the straight vane 19 of FIGS. 5 and 6, while having a greater radial component, is found to create a far greater updraft effect than the plain upturned, fanlike surfaces provided for blades of the past. That is, the radial component has little effect on the updraft created. However, if it is found desirable to inhibit the radial component in a particular mower housing it is recommended that the construction of FIGS. 1 through 4 be used.

In FIG. 7 a modification of the blade construction illustrated in FIG. 1 is shown wherein in place of the longitudinal slot 14 a plurality of aligned holes are provided. The use of holes 21 in place of an open slot inhibits the updraft created to an extent, but it is found that the updraft thus provided is still substantially greater than the updraft effect provided by the fanlike surfaces of past blades.

Another modification is shown in FIG. 8 wherein the trailing edge of a blade is stamped out as at 22 to provide a slot and the stamped-out metal turned down as at 23 to provide an upstanding vane. In this instance the vane terminates short of the horizontal plane of the cutting edge 11. As shown there is no vane structure above the upper edge of the blade. This type structure performs satisfactorily and has the advantage that it is comparatively inexpensive to manufacture.

It may be seen therefore that the canted vanes provided herein insure that the updraft created starts from beneath the cutting circle where it has its greatest effect upon the grass being cut, pulling such grass up into the cutting circle.

I claim:

1. A rotary lawnmower blade having cutting edges along the leading edges thereof adjacent the respective ends, means defining an opening in the trailing edge of each end of the blade, said means including a vane at the trailing edge that is canted such that its lower edge leads its upper edge in the direction of rotation of the blade.

2. A rotary lawnmower blade as set forth in claim 1 in which said opening is in the form of a slot extending longitudinally of the blade.

3. A rotary lawnmower blade as set forth in claim 2 in which each vane is substantially as long as and parallels the adjacent cutting edge.

4. A rotary lawnmower blade as set forth in claim 2 in which an outer endwise portion of the blade is bent to slant upwardly toward the trailing edge, and in which the lower leading edge of said vane extends no farther down than the adjacent cutting edge.

5. A rotary lawnmower blade as set forth in claim 2 in which the respective inner and outer ends of each vane are curved around the respective ends of the adjacent slot.

6. A rotary lawnmower blade as set forth in claim 1 in which each vane is planar.

7. A rotary lawnmower blade as set forth in claim 1 in which at least the outer end of each vane is curved around the adjacent end of said slot.

8. A rotary lawnmower blade as set forth in claim 1 in which said vane is integral with said blade.

9. A rotary lawnmower blade as set forth in claim 1 in which said vane extends both below and above the trailing edge of said blade.

10. A rotary lawnmower blade as set forth in claim 1 in which said vane extends only below the trailing edge of said blade.

* * * * *